Dec. 18, 1962 W. L. WILSON 3,069,281
METHOD OF PREPARING METAL OXIDES
Filed Oct. 26, 1959 3 Sheets-Sheet 1

INVENTOR.
WILLIAM L. WILSON
BY Oscar L Spencer
ATTORNEY

Dec. 18, 1962 — W. L. WILSON — 3,069,281
METHOD OF PREPARING METAL OXIDES
Filed Oct. 26, 1959 — 3 Sheets-Sheet 2

INVENTOR.
WILLIAM L. WILSON
BY
Oscar L. Spencer
ATTORNEY

Dec. 18, 1962  W. L. WILSON  3,069,281
METHOD OF PREPARING METAL OXIDES
Filed Oct. 26, 1959  3 Sheets-Sheet 3
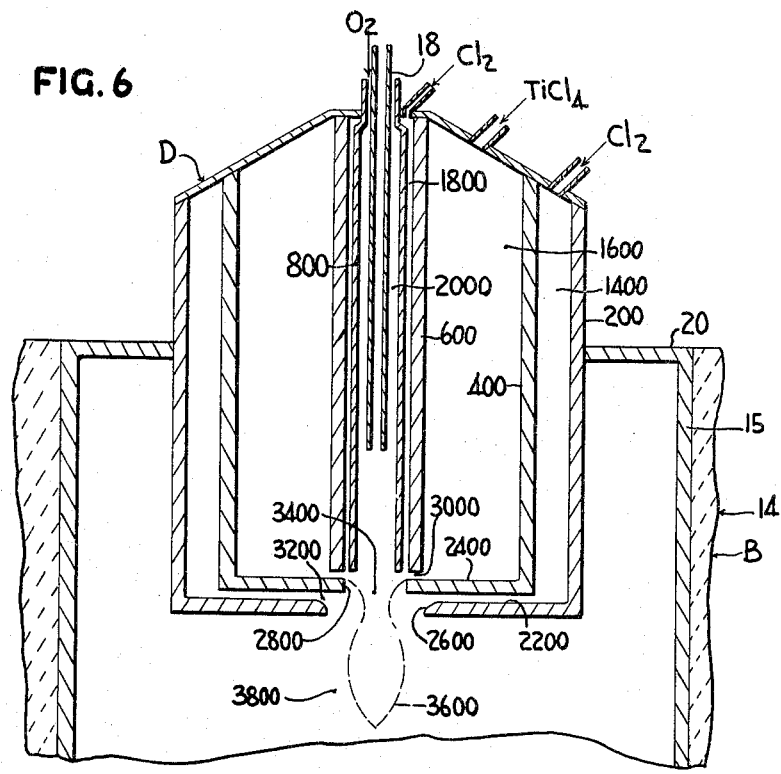
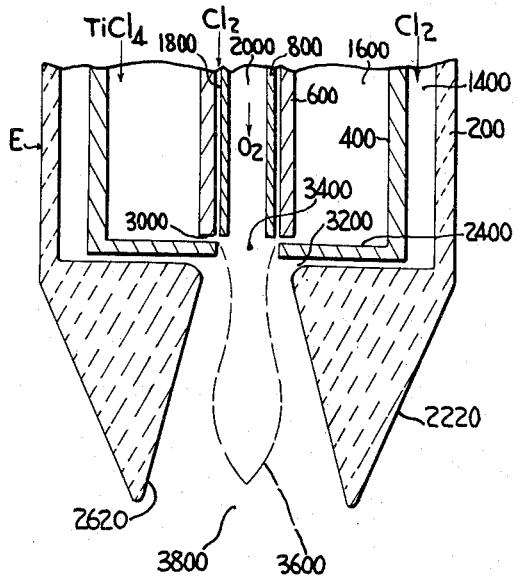
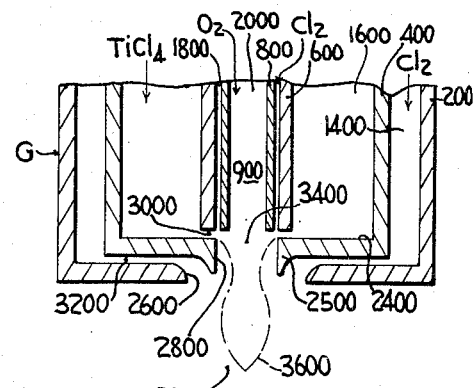
INVENTOR.
WILLIAM L. WILSON
BY
Oscar L. Spencer
ATTORNEY

United States Patent Office 3,069,281
Patented Dec. 18, 1962

3,069,281
METHOD OF PREPARING METAL OXIDES
William L. Wilson, Barberton, Ohio, assignor, by mesne assignments, to Pittsburgh Plate Glass Company
Filed Oct. 26, 1959, Ser. No. 848,750
8 Claims. (Cl. 106—300)

The present invention relates to the preparation of titanium dioxide and more particularly to the vapor phase oxidation of titanium tetrachloride to produce an improve titanim dioxide pigment.

According to the present invention, a well dispersed titanium dioxide pigment of high quality is prepared having improved tinting strength, hiding power, and other enhanced properties which make it extremely desirable for use as a pigment in rubber, paper, and paint, and for many other uses.

According to the process of the present invention, titanium dioxide having enhanced tinting strength and particle size characteristics compared to the products of the above-described processes, is produced by bringing together separate streams of titanium tetrachloride vapor and an oxygen containing gas in a relatively confined area, and projecting the resultant streams into a relatively large unconfined reaction space maintained at a temperature sufficiently high a sustain and to propagate the reaction between the gaseous streams to produce titanium dioxide.

Thus, according to this embodiment of the present invention, an annular stream of titanium tetrachloride vapor is projected angularly against a stream of oxygen from a plurality of points around the periphery of the oxygen stream. The mass velocity of the $TiCl_4$ stream should be large in comparison to the mass velocity of the $O_2$ stream, so that there is a tendency for the oxygen stream and/or the resulting reaction mixture to neckdown or reduce in cross-sectional area substantially at or somewhat below the point of titanium tetrachloride introduction to an area smaller than that of the original oxygen stream and/or the resulting reaction mixture. Thereafter, the contacted reactant streams are projected into a reaction space having a cross-sectional area, measured perpendicularly to the direction of flow of the stream, substantially larger, usually at least about 50% larger than the cross-sectional area of the initial oxygen stream or the titanium tetrachloride stream. A theoretical flow pattern of reactants is thus produced having a small cross-sectional area at a plane substantially at or somewhat below the point of contact of the streams and gradually increasing in cross-sectional area to an area larger than that of the original oxygen stream at a plane in the reaction space a considerable distance below the point of contact of the reactant streams and perpendicular to the direction of their flow. From this latter plane, the flow rapidly tapers to a point at which the titanium tetrachloride is exhausted and no reaction takes place. Such a flow pattern of reactants produces a high quality titanium dioxide pigment.

According to a preferred embodiment of the present invention, a method of producing titanium dioxide has been discovered which comprises establishing a hot gaseous stream of oxygen or oxygen containing gas and an annular stream of hot titanium teracloride surrounding the oxygen stream, introducing titanium tetrachloride from points around the oxygen stream inwardly toward the oxygen stream and in a transverse direction with respect to the oxygen stream, projecting the resulting mixture into a reaction space having a cross-sectional area greater than that of the annular stream, while simultaneously separately projecting an outer stream of an inert gas into the reaction space in the direction of flow of the stream of oxygen and titanium tetrachloride from points surrounding the point of entry of the oxygen and titanium tetrachloride streams into the reaction space and adjacent said point of entry.

According to this preferred embodiment of the present invention it has been found possible to further improve the quality of the pigment produced by separately introducing an outer stream of a gas which is non-reactive to titanium dioxide at the conditions herein described into the reaction space at a point or points spaced around or circumferentially about the point of entry of the oxygen and titanium tetrachloride mixture into the reaction space, whereby to permit flow of the inert gas into the reaction space in the direction of flow of the reacting streams. This gas will hereinafter be referred to as "inert" gas. The introduction of the outer inert gas stream into the reatcion space is at a point where the reaction is substantially incomplete. Therefore the inert gas will flow into the reaction space in an area of relatively high $TiCl_4$ concentration. Further, at the point of introduction of the inert gas, there will be substantially no $TiO_2$ particles present.

Introduction of the inert gas into the reaction space as herein described has the synergistic effect of producing a high quality product having a tinting strength substantially above that obtained when no such gas is used. The precise function of the inert gas in producing this synergistic effect is not entirely clear. However, introducing the inert gas in the discovered manner prevents formation of coarse particles, leads to the production of a highly desirable product having a high tinting strength, and also effectively eliminates formation of non-pigmentary, crystalline titanium dioxide on the surfaces of the reactor.

Care, however, must be exercised in introducing the inert gas to insure that too great an amount is not utilized, for it has been discovered that too much inert gas leads to formation of an inferior, fine product which has poor tinting strength and hiding power, as will be pointed out hereinbelow. It is also important in carrying out the instant invention that the inert gas be introduced into the reaction space near the point of entry of the reaction mixture therein. Thus, the inert gas should be introduced either in a plane which contains the point of entry of the reacting gases into reaction space or which is at a distance spaced from this point of entry of not more than about 25 percent of the total length of the theoretical flow pattern of the reactants in the direction of flow of the reactants. Further, although the plane in which the inert gas is introduced is preferably perpendicular to the direction of flow of the reactants, the radial or lateral component of the mass velocity of the inert stream impinging upon the reacting mixture should be low in comparison to the mass velocity of the reacting mixture. Introducing the inert gas into the reaction space in planes further away from the point of entry of the reacting streams than has been indicated leads to the formation of inferior product.

According to another embodiment of the present invention, a method of producing titanium dioxide has been discovered which comprises establishing a hot gaseous stream of oxygen or oxygen containing gas and an annular stream of hot titanium tetrachloride surrounding the oxygen stream, introducing titanium tetrachloride from points around the oxygen stream inwardly toward the oxygen stream and in a transverse direction with respect to the oxygen stream, projecting the resulting mixture into a reaction space having a cross-sectional area substantially greater than that of the annular stream, while simultaneously separately projecting into the reaction space an outer stream of an inert gas in the direction of flow of the stream of oxygen and titanium tetrachloride from points surrounding the point of entry of the oxygen and titanium tetrachloride streams into the reaction space and adjacent said point of entry; and an inner stream of inert gas between the oxygen and titanium tetrachloride streams from points surrounding the oxygen stream and circumscribed by the titanium tetrachloride stream and closely adjacent the point of contact of these reacting streams.

According to this embodiment of the present invention it has further been found possible to enhance the particle size and tinting strength of the product produced and to substantially prevent formation of non pigmentary, crystalline titanium dioxide on the surfaces of the reactor by introducing an inner stream of gas inert to titanium dioxide at the conditions of the reaction into the reaction space between the oxygen and titanium tetrachloride streams from points surrounding the oxygen stream and circumscribed by the titanium tetrachloride stream and closely adjacent the point of contact of the reactant streams. Thus, the inner inert gas stream is preferably introduced between the $O_2$ and $TiCl_4$ reactant streams at or near the point where the tendency for the $O_2$ stream or the reaction mixture to neck-down or reduce in cross-sectional area occurs. Accordingly, the point of introduction of the inner inert gas stream will generally be removed from the area where the large majority of the reaction occurs and will be in an area where the $TiCl_4$ is substantially unreacted. Further, there will be no, or substantially no particles of $TiO_2$ present at the point of contact of the inner inert gas stream with the reacting streams. It has been discovered that introducing the inner stream of inert gas in this manner produces an inert interface between the reactant streams for a short period of time sufficient to enable the reactant streams to clear the feed tubes in a substantially non-diffused condition. This inner inert gas stream accordingly prevents formation of titanium dioxide on or near the feed tubes and consequently eliminates coating or clogging of these tubes and the surfaces surrounding them with crystalline, non-pigmentary titanium dioxide. In addition to elimination of crystalline titanium dioxide formation, careful control of the quantity of inner inert gas introduced considerably enhances the tinting strength and particle size characteristics of the final product.

The invention will be more clearly understood from the drawings which are merely illustrative and are not intended to limit the scope of the discovery.

FIGURE 6 is a vertical section of a furnace and modified burner used to carry out the process of the instant invention.

FIGURES 7 and 8 are vertical sections of modified burners used in conjunction with the furnace of FIGURE 6.

The same numbers are used in the drawings to indicate similar parts.

Figure 1:
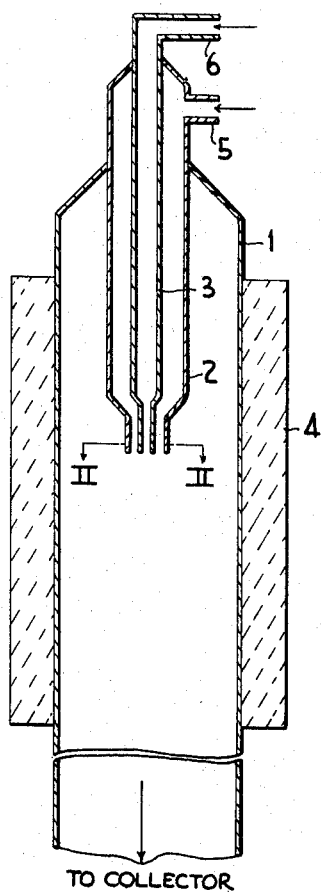
FIGURE 1 is a diagrammatic vertical section of an orifice-annulus burner and furnace.

Referring to FIGURE 1, three vertically-disposed tubes 1, 2 and 3 pass into furnace 4, tube 3 being disposed within tube 2 and concentrically-located with respect thereto, and tube 2 being, in turn, disposed within tube 1 and being concentrically-located with respect thereto. Tubes 2 and 3, respectively, are spaced apart from the internal walls of the tubes they inhabit, thus providing annular spaces therebetween. Both tubes 2 and 3 are open at their lower ends and, in addition, have conduits 5 and 6, respectively, leading into their upper ends.

Only the upper portion of tube 1 was disposed within furnace 4, the lower portion leading to a collector indicated but not shown in the drawings. The lower open ends of tubes 2 and 3 terminate at points within tube 1 laterally delineated by furnace 4.

Figure 2:
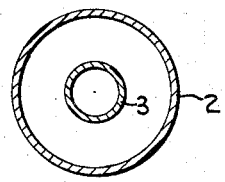
FIGURE 2 is a diagrammatic cross-section of the orifice-annulus section of the burner in FIGURE 1, taken substantially along the line II—II of FIGURE 1.

FIGURE 2, while diagrammatic, shows tubes 2 and 3 in cross-section, thus further illustrating the orifice-annulus type of burner of FIGURE 1.

Figure 3:
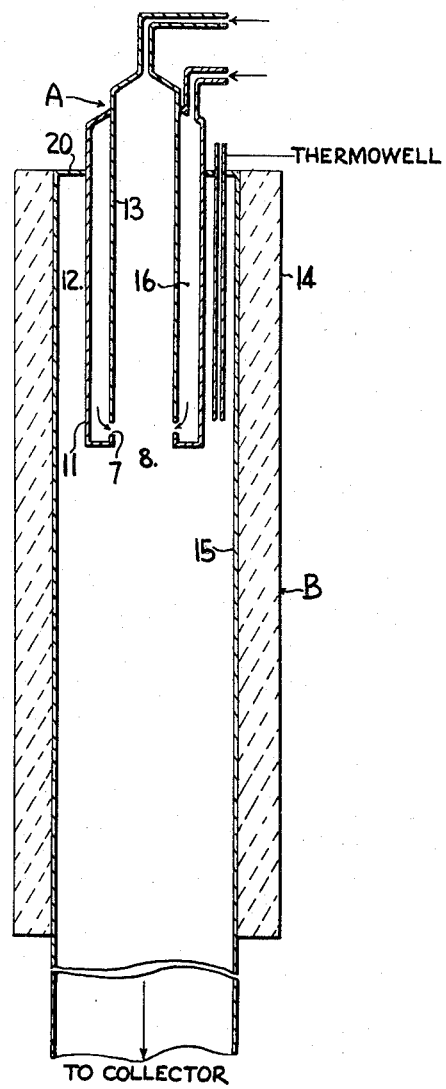
FIGURES 3, 4 and 5 are diagrammatic vertical sections of burner and furnace combinations suitable for the present invention.

Referring to FIGURE 3, burner assembly A comprises two vertically-disposed tubes 11 and 13 which pass into furnace B made up of electric heating means 14 and tube 15. Tube 13 is disposed within tube 11 and concentrically located with respect thereto.

The annulus or annular space 16 defined by the walls of tubes 11 and 13 is sealed at its lower end except for circumferential slot 7 provided in the lower end of tube 13. As will be seen hereinafter and as is evident from the drawing, tubes 11 and 13 are spaced apart from the internal walls of the tubes they inhabit, thus providing annular spaces in burner assembly A. Burner tubes 11 and 13 are open at their upper ends. At their lower ends tubes 11 and 13 communicate with reaction zone 8, tube 11 communicating via circumferential slot 7.

The annulus 12 provided between tube 11 of burner assembly A and tube 15 has a thermowell disposed therein. The thermowell passes downwardly through cover 20 of furnace assembly B and extends about the same distance into furnace assembly B as tubes 11 and 13, the bottom tip of the thermowell being disposed approximately opposite circumferential slot 7. Tube 15 extends downwardly beyond heating means 14 to a collector, not shown, but indicated.

Figure 4:
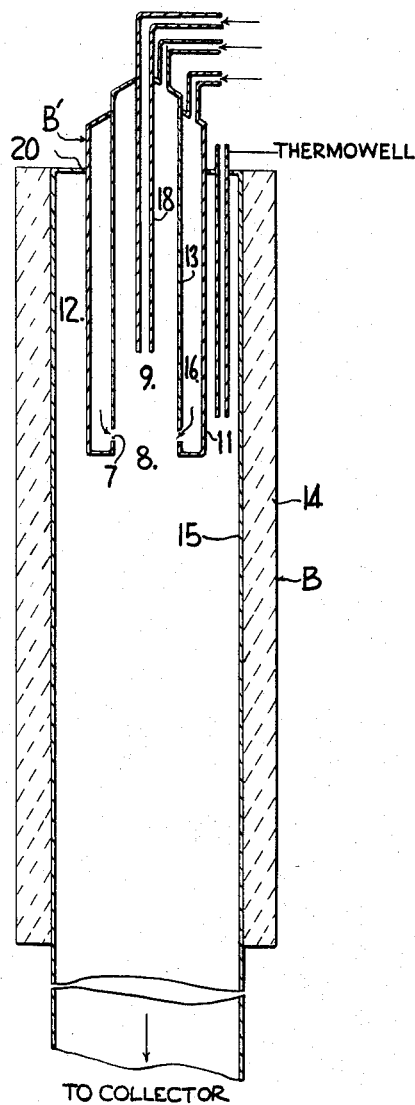

Referring to FIGURE 4, burner assembly B¹ comprises vertically-disposed tubes 11, 13 and 18 which pass into furnace assembly B made up of electric heating means 14 and tube 15. Tube 18 is a pilot jet of small diameter disposed within tube 13 and concentrically-located with respect thereto. Tube 13, in turn, is disposed within tube 11 and is concentrically located with respect thereto.

The annulus or annular space 16 defined by the walls of tubes 11 and 13 is sealed at its lower end except for circumferential slot 7 provided in the lower end of tube 13. As will be seen hereinafter and as is evident from the drawing, tubes 11, 13 and 18 are spaced apart from the internal walls of the tubes they inhabit, thus providing annular spaces in burner assembly B¹. Burner tubes 11, 13 and 18 are open at their upper ends. At its lower end tube 18 communicates with reaction zone 9, tube 13 opens into reaction zone 8 and tube 11 communicates via circumferential slot 7 with reaction zone 8.

The annulus 12 provided between tube 11 of burner assembly B¹ and tube 15 has a thermowell disposed therein. The thermowell passes downwardly through cover 20 of furnace assembly B¹ and extends about the same distance into furnace assembly B as pilot jet 18.

Pilot jet 18 as shown in the drawing, is retracted into tube 18 to provide a predetermined distance between its lower tip and circumferential slot 7. Tube 15 extends downwardly beyond heating means 4 to a collector not shown but indicated.

While the distance between the tip of pilot jet 18 and circumferential slot 7 is usually at least about 0.5 centimeter, and generally between 0.5 centimeter and 3 centimeters, substantially longer distances are contemplated herein, as will be evident from the description to follow.

Figure 5:
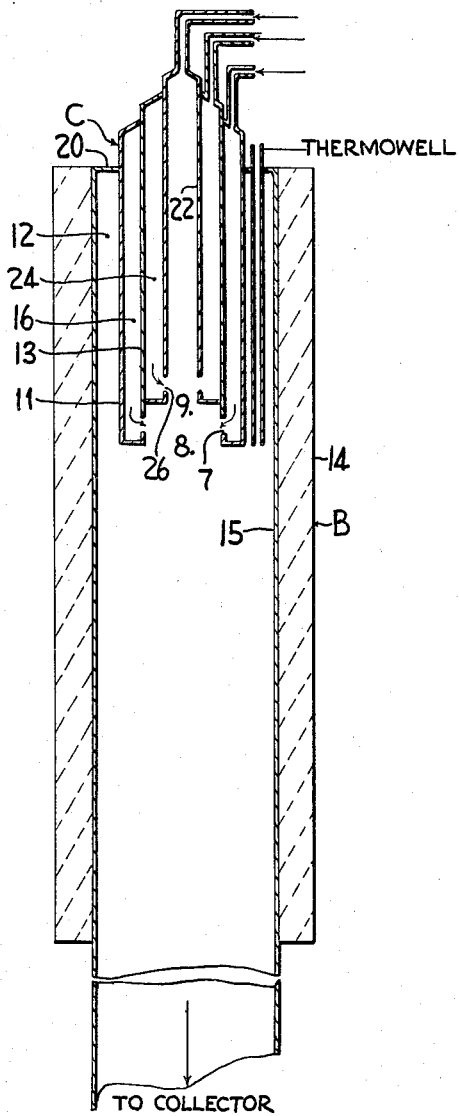

FIGURE 5 differs from FIGURE 4 only in that in its burner assembly C tube 22 corresponding to tube 18 in FIGURE 4 is not a pilot jet but a wider tube retracted within tube 13, concentrically-located with respect thereto and spaced apart from the internal wall of tube 13, thus providing annular space 24 which is sealed at its lower end except for circumferential slot 26 provided in the lower end of tube 22 and opening into reaction zone 9. The lower tip of tube 22 is above circumferential slot 7, thus providing a predetermined distance between circumferential slots 26 and 7.

Referring to the embodiment shown in FIGURE 6 there is shown a reaction furnace B similar to that shown in FIGURE 4 having a heating element 14 and a tube 15 providing a reaction space 3800. Also furnace B is equipped with a burner D used to carry out the process of the instant invention. The burner is provided with four vertically disposed and concentrically arranged tubes 200, 400, 600, and 800 which extend into the reaction space. The tubes are spaced from each other to provide concentric annular passages 1400, 1600, 1800 and 2000, respectively. Tubes 200 and 400 have flat faces 2200 and 2400 respectively at the lower ends thereof. Face 2200 has a relatively large opening 2600 and face 2400 is provided with a relatively smaller opening 2800 approximately equal in diameter to central passage 2000.

In an embodiment not shown in the drawing, flat face 2200 may be removed, in which event the inert gas stream would flow directly into the reaction space via annular passage 1400. Because the flow pattern of the reacting gases produces a Venturi effect, however, the inert gas would flow past flat face 2400 in almost the same manner as it does when flat face 2200 is present.

Pilot tube 18 is disposed within central passage 2000 in the same manner as discussed hereinabove in connection with FIGURE 4.

Tube 600 and flat face 2400 are spaced from each other to form an annular slot 3000 therebetween, and faces 2200 and 2400 are spaced apart to form annular slot 3200 therebetween. Tubes 200, 400, 600 and 800 may be vertically adjustable to vary the size of slots 3000 and 3200. Tube 600 and opening 2800 further define a relatively small confined zone or area 3400 which serves as a contact area for the reactant gases. The reaction space 3800 is disposed below flat face 2200.

In operation of a device of the type described in FIGURE 6, the temperature of the furnace reaction space is raised to reaction temperature, i.e., 500° C. to 1500° C., be heating element 14, and oxygen or an oxygen-containing gas, and titanium tetrachloride, are separately fed at controlled rates in the proportions mentioned above into annular passages 1600 and 2000, respectively. Preferably, the oxygen is fed centrally in passage 2000.

The oxygen and titanium tetrachloride are preferably preheated prior to introduction into the reactant space to a temperature above 500° C. and preferably above 800° C. Preheating may be done external to burner D, for example in bayonet heaters. Also, if desired, the portion of burner D immersed in furnace B may conveniently serve as a preheater to supply at least a portion of the necessary preheat to the reactant streams. The ratio of $TiCl_4$ and $O_2$ fed to burner D may vary from on a mole basis from about 1:1 to 1:10, and preferably from about 1:1 to 1:5.

The mass velocity and direction of flow of the titanium tetrachloride feed, and the size of opening 2800 are such that there is a tendency for the oxygen stream and/or reacting streams to become reduced or necked down in diameter adjacent openings 2600 and 2800, so that the area of the contacted streams tends to be smaller than the area of the oxygen stream in a plane adjacent to or somewhat below slot 3000. A reacting stream flow profile is thus produced which assumes the approximate shape indicated in phantom at 3600. The reacting stream flow profile grows in cross sectional area from the indicated necked down portion adjacent or somewhat below the point of contact of the reacting streams to a relatively large cross sectional area in a plane considerably below flat face 2200 and perpendicular to the direction of flow of the reactants, and then rapidly converges to a point where the reaction is substantially complete.

The reacting stream flow profile described can be visually demonstrated when a hydrocarbon gas used in lieu of titanium tetrachloride, is reacted with oxygen while maintaining the mass velocity relationships existing in the burner described above. However, with $TiCl_4$ it is impossible actually to see the flow pattern under normal operating conditions owing to the fact that the pigment produced by the reacting stream obscures vision at the conditions of the reaction.

An outer stream or streams of gas in introduced through passage 1400 and slot 3200 and projected through opening 2600 at the upper region of the reaction space 3800. This gas may be chlorine, nitrogen, any of the noble gases, carbon dioxide, and like gases. The gas introduced as the outer stream should be inert to $TiO_2$ at the conditions of the reaction. Thus, the outer gas stream is introduced into the reaction space in the form of a narrow annular stream projected from points surrounding the reacting streams and closely adjacent the point of entry of the reacting streams into reaction space 3800. The outer gas stream flows into the reaction space in the general direction of flow of the reacting streams and with low or substantially no lateral or radial velocity component, and considerably reduces the formation of coarse titanium dioxide particles, thereby enhancing the tinting strength of the product.

The quantity of the outer stream may vary between about 25 and 500 mole percent of the quantity of $TiCl_4$ introduced, but is preferably between 50 and 250 mole percent of the quantity of $TiCl_4$ introduced.

An inner inert gas stream is introduced through passage 1800 into the contact area 3400. This inner gas stream may be chlorine, nitrogen, any of the noble gases, carbon dioxide, or any other. The inner gas stream should comprise a gas which is inert to $TiO_2$ under the conditions of the reaction. The quantity of the inner inert gas stream may vary from about 10 to 300 mole percent of the quantity of $TiCl_4$ introduced, and is preferably between about 20 and 100 mole percent of the quantity of $TiCl_4$ introduced. At the point of contact of the inner inert gas stream, there is no or substantially no $TiO_2$ particles present.

The reaction mixture of gases and titanium dioxide is cooled in the lower portion of tube 15 (not shown), and the titanium dioxide subsequently removed from the gases, as described above in connection with FIGURE 4.

Referring to FIGURE 7, a modified burner E is shown for use in reaction furnace of FIGURE 6. This burner is substantially identical to the burner D of FIGURE 6 except for nozzle 2220. Nozzle 2220 is frusto-conical in shape as shown, and has a frusto-conically shaped nozzle opening 2620 which has a smallest diameter adjacent flat face 2400 and tapers to a largest diameter at the tip of the nozzle.

The outer inert gas stream is introduced into the reaction space 3800 through slot 3200 essentially in the direction of flow of the reactants in the form of a narrow annular stream surrounding the point of introduction of the reactants and closely adjacent the port of entry of the reacting streams into the reaction space. The frusto-conical opening 2620 permits establishment of a theoretical reacting stream flow profile substantially as shown in phantom at 3600. In other respects, the operation of burner E is similar to burner D described above in connection with FIGURE 6.

In FIGURE 8 is shown an embodiment of a burner G for use in the reactor of FIGURE 6 which is substantially the same as burner D except for an annular baffle 2500 which is attached to the underside of flat face 2400 and extends into the path of flow of the outer gas stream emanating from slot 3200. The side of baffle 2500 facing the outer gas stream is curved convexly inwardly as shown to direct the outer stream of gas downwardly in the direction of flow of the reactants. In burner G therefore the gas stream enters the reaction zone in a direction parallel to the flow of the reactants in the form of a narrow annular stream circumscribing the reactant streams and the nozzle opening 2800 through which the reactant streams enter the reaction space 3800.

In other respects, the operation of burner G is similar to the operation of burner D described above in connection with FIGURE 6.

It should be noted that annular slots 3000 and 3200 in the burners hereinabove described in connection with FIGURES 6-8 need not be continuous, but may be discontinuous so as to form a spray or a plurality of gaseous streams flowing therethrough.

When discontinuous slots or holes are used, the shape of the slots may vary. Thus, slots that are circular, elliptical, square or rectangular may be used. Further the discontinuous slots may be spaced radially, nonradially, or in any other manner about the contact area 3400 and/or reaction space 3800.

In the processes described in connection with FIGURES 6-8, it is important to introduce the inert gas in the vicinity of the necked down portion of the flame profile where the reactants enter the reaction space, and to flow the inert gas in the general direction of flow of the reactant streams.

In carrying out the process described in connection with FIGURES 6-8, the relative mass velocities of the titanium tetrachloride and oxygen containing streams are important. The mass velocity of titanium tetrachloride should be in the range of about 0.5 to 100 times the mass velocity of the oxygen containing stream, and is preferably between about 2.0 to 75 times the mass velocity of the oxygen containing stream. When pure oxygen is used, it is important to keep the ratio of the mass velocity of the titanium tetrachloride stream to that of the oxygen stream above unity.

The reactant streams need not be preheated to the same temperature. Thus, the titanium tetrachloride may be preheated to a lower temperature than the oxygen containing gas to simplify the equipment. Also, only one of the reactant streams, for example the $TiCl_4$ stream, need be preheated. Heat capacity considerations predict that for every 100° C. increase in the oxygen preheat, a 40° C. reduction could be made in the titanium tetrachloride preheat. For example, when the titanium tetrachloride is heated to about 875° C., and the oxygen containing stream preheated to 1075° C., a high quality product is produced. The average temperature of the reacting gases entering the reaction zone should in any event be at least 500° C. and preferably between 800° C. and 1200° C.

The temperature of the reaction space may vary between about 500° C. and 1500° C., and preferably between 800° C. and 1200° C. Additional heat may be supplied to the reaction space if necessary by heating element 14 in furnance B to maintain the desired temperature.

The outer and inner gas streams may be introduced into the reaction space at room temperature, or the outer and inner gas streams may be preheated to about the temperature of the reaction zone, or between about 500° C. and 1500° C. Care must be exercised in introducing the outer and inner gas streams to insure that the temperature of the reaction space does not fall below that required to sustain the oxidation reaction.

The outer gas stream should be introduced through slot 3200 in such a manner as to have little or no effect on the flame profile of the reactant gases. Preferably, the velocity of the outer stream should be such as to have little or no lateral or radial component. Thus the outer inert stream may flow into reaction space 3800 generally parallel to the flow of the reactants. The outer inert stream could also be introduced into the reaction space perpendicularly to the direction of flow of the reacting streams, but with a radial or lateral component of velocity which is low in comparison to the mass velocity of the reacting mixture. Further, the outer inert gas stream could be introduced into the reaction space tangentially to the direction of flow of the reacting mixture. Thus, depending upon the gas introduced as the outer stream, the radial mass velocity of the outer stream flowing through slot 3200 may vary from about 0 to 1.0 times the mass velociy of the titanium tetrachloride feed and is preferably between .1 and .5 times the mass velocity of the titanium tetrachloride stream.

Care should be exercised in introducing the inner gas stream through space 1800 to insure that the flow pattern of the reactant streams is affected to a minimum degree. The linear velocity of the inner insert gas stream is preferably approximately equal to the linear velocity of the reactant streams so that turbulence due to this stream at the point of contact with the reacting streams is minimized.

The instant discovery will best be understood by reference to the following examples, which although detailed, are not intended to limit the scope of the invention in any way.

EXAMPLE I

Referring to FIGURE 1, a two inch vertically-disposed porcelain (mullite) tube 1 was provided which was heated for 24 inches of its length by electric furnace 4, the temperature of the upper and lower halves of vertically-mounted furnace 4 being separately controlled. An orifice-annulus burner (tubes 2 and 3), vertically-disposed and directed into tube 1, extended 6 inches below the top of furnace 4, thus utilizing the upper 6 inch portion of furnace 4 as a preheater and the lower 18 inches as a reaction zone heater.

Burner tubes 2 and 3 were fabricated from silica tube (quartz and Vycor). Tube 3 had an inside diameter of 1.25 millimeters at its exit. Tube 2 had an inside diameter of 5.2 millieters. The wall thickness of the tubes was about ½ millimeter.

A vapor mixture of $TiCl_4$ and benzene was fed into tube 3 while simultaneously oxygen was fed into tube 2 at the rates, temperatures and concentrations given in the following table:

*Table 1*

| $TiCl_4$ Feed Rate [1] | $O_2$ Molar Ratio [2] | Benzene Concentration [3] | Preheat Temperature, ° C. | Reaction Temperature, ° C. |
| --- | --- | --- | --- | --- |
| 7.1 | 2.0 | 2.0 | 825 | 1,000 |
| 7.1 | 2.5 | 2.0 | 825 | 1,000 |
| 6.9 | 2.0 | 2.0 | 825 | 1,000 |
| 6.7 | 2.0 | 2.0 | 825 | 1,000 |
| 4.8 | 2.1 | 2.0 | 825 | 1,000 |
| 8.9 | 2.0 | 4.0 | 825 | 1,000 |
| 6.9 | 2.0 | 2.0 | 825 | 950 |

[1] Millimoles per minute.
[2] $O_2/TiCl_4$ molar ratio.
[3] Mole percent, $TiCl_4$ basis.

The $TiO_2$ pigments resulting from the runs in Table I were well dispersed and of uniform particle size, had good tinting strengths and were predominantly in the rutile crystalline form.

EXAMPLE II

As in Example I above, a tube 1 was inserted into a furnace 4, the tube and furnace having the same dimensions and relative positions as in Example I. An orifice-annulus burner (tubes 2 and 3) were also provided as in Example I, only the burner dimensions were slightly different as to orifice an annulus sizes. Tube 3 had an inside diameter of one millimeter and an outside diameter of 2.5 millimeters at its exit. Tube 2 had an inside diameter of 5.0 millimeters. Accordingly, the size of the annulus around tube 3 was 1.25 millimeters.

A mixture of $TiCl_4$ and an aromatic organic compound was fed through tube 3 and a mixture of $O_2$ and $Cl_2$ was fed through tube 2 at the rates, temperatures and concentrations given in the following tabe:

*Table II*

| $TiCl_4$ Feed Rate [2] | $O_2$ Feed Rate [2] | $Cl_2$ Feed Rate [3] | Additive | Concentration of Additives [4] | Preheat Temp., °C. | Reaction Temp., °C. |
|---|---|---|---|---|---|---|
| 5.23 | 19.9 | 0.25 | Monochlorobenzene | 4.0 | 825 | 1,000 |
| 4.71 | 19.9 | 0.25 | Trichlorobenzene | 6.7 | 825 | 1,000 |
| 4.84 | 19.9 | 0.25 | Diphenyl | 1.65 | 825 | 1,000 |
| 5.03 | 19.9 | 0.25 | Naphthalene | 2.0 | 825 | 1,000 |

[1, 2, 3] Millimoles per minute.
[4] Mole percent, $TiCl_4$ basis.

The $TiO_2$ pigments resulting from the runs in Table II were well dispersed and for uniform particle size, had good tinting strength, and were predominantly in the rutile crystalline form.

EXAMPLE III

Referring to FIGURE 3, furnace assembly B was made up of an electric furnace 14 which was 24 inches long and had a 4-inch (diameter) quartz tube 15 vertically-disposed therein. The upper and lower halves of heating means 14 were separately controlled as to temperature. A burner assembly A comprising tubes 11 and 13 was directed, as described above, into furnace assembly B through the top 20 thereof, the end of tubes 11 and 13 extending to a point about 6 inches below furnace top 20.

Tubes 11 and 13 were fabricated from silica tubing (quartz and Vycor) and had internal diameters, respectively, of 17 millimeters and 10 millimeters. Circumferential slot 7 was 0.5 milliameter in width. It is obvious from these dimensions that FIGURE 3 is not drawn to scale.

In operation gaseous $TiCl_4$ was fed into reaction zone 8 via annulus 16 at the rate of 20.5 millimoles per minute. Admixed with the gaseous $TiCl_4$ was gaseous benzene in a proportion to provide 0.41 millimole of benzene per minute to reaction zone 8. Simultaneously, substantially anhydrous oxygen gas was introduced into reaction zone 8 via tube 13 at a rate to provide an $O_2$ to $TiCl_4$ molar ratio of 1.2 to 1. The momentum ratio, i.e., the ratio of $TiCl_4$ mass velocity to $O_2$ mass velocity at the point of mixing, was 25. Reaction zone 8 was maintained by means of heating means 14 at about 1000° C. throughout the run, the individual streams being preheated to a temperature of about 825° C. prior to their entry into reaction zone 8.

The benzene additive was present in the proportion of about 2 mole per cent, basis the $TiCl_4$ reactant. Product $TiO_2$ passed through tube 15 to the collector (not shown).

The $TiO_2$ pigment produced in Example III was predominantly in the rutile crystalline form, was well-dispersed, of uniform particle size and had good tinting strength. The average particle size thereof was about 0.2 micron.

While Example III teaches a single circumferential slot as a preferred means for feeding a $TiCl_4$-aromatic organic compound mixture into reaction zone 8, other modifications, such as a plurality of slots or openings providing spray-like streams of $TiCl_4$-aromatic organic compound capable of impinging upon a moving oxygen-containing gaseous stream, are also contemplated.

EXAMPLE IV

Referring to FIGURE 4, furnace assembly B was made up of an electric furnace 14 which was 24-inches long and had a 4-inch (diameter) quartz tube 15 vertically-disposed therein. The upper and lower halves of heating means 14 were separately controlled as to temperature. A burner assembly B[1] comprising tubes 11, 13 and 18 was directed, as described above, into furnace assembly B, the ends of tubes 11 and 13 extending to a point about 6 inches below the furnace top 20.

Tubes 11, 13 and 18 were fabricated from silica tubing (quartz and Vycor) and had internal diameters, respectively, of 17 millimeters, 10 millimeters and 1 millimeter. The tip of pilot jet 18 was positioned about 1 centimeter above circumferential slot 7, thus providing reaction zone 9. Circumferential slot 7 was 0.5 millimeter in width. It is obvious from these dimensions that FIGURE 4 is also not drawn to scale.

In operation gaseous $TiCl_4$ was fed via space 16 through slot 7 to reaction zone 8 at a rate sufficient to provide 18.7 millimoles of $TiCl_4$ per minute. Simultaneously, gaseous $TiCl_4$ containing about 10 mole percent benzene (i.e., about 1 mole percent based on the total $TiCl_4$) was fed via jet 18 into reaction zone 9 at a rate to provide 1.9 millimoles of $TiCl_4$ per minute and 0.19 millimole of benzene per minute. Also, at the same time, gaseous substantially anhydrous oxygen was fed through tube 13 at a rate sufficient to provide an $O_2$ to total $TiCl_4$ molar ratio of 1.22.

Reaction between the $TiCl_4$ fed through tube or pilot jet 18 and the substantially anhydrous $O_2$ fed through tube 13 took place in reaction zone 9 in the presence of benzene. The resulting suspension of $TiO_2$ solids in excess oxygen was contacted almost immediately with the $TiCl_4$ entering reaction zone 8 through circumferential slot 7.

The temperature in reaction zone 9 was maintained by means of heating means 14 at about 825° C. throughout the thirty-minute run and in reaction zone 8 at about 1000° C. Product $TiO_2$ passed through tube 15 to the collector (not shown).

The $TiO_2$ pigment produced in Example IV was predominantly in the rutiile crystalline form, was well-dispersed, of uniform particle size and had good tinting strength. The average particle size thereof was about 0.2 micron.

According to the embodiment of the invention represented by Example IV, the titanium tetrachloride-aromatice organic compound component, the oxygen-containing gas component, and the titanium tetrachloride component are preferably preheated separately to a temperature between about 700° C. and 1000° C. Although this is a preferred embodiment, pre-heat temperatures from about 500° C. to about 1200° C. are contemplated herein and reaction temperatures, as stated hereinabove, ranging from about 700° C. to about 1500° C., preferably between 850° C. and 1100° C.

The mole ratio of $TiCl_4$ to $O_2$ fed to reaction zone 8 may range from 1:1 to 1:10, preferably between 1:1 and 1:5.

The average particle size of the $TiO_2$ pigment prepared as contemplated herein is generally less than about 0.25 micron and usually in the range between 0.1 to 0.22 micron. Furthermore, the gaseous suspensions referred to hereinabove contain $TiO_2$ solids in the particle size from 0.01 to 0.15 micron, preferably less than about 0.1 micron. Also, when the $TiO_2$ particulates are prepared in situ as in Example IV, they are preferably contacted with the major $TiCl_4$ reactant (as in reaction zone 8) in less than about 8 seconds, generally between 0.1 to 3 seconds, after production of the $TiO_2$ nuclei or particulates. In other words, it is desirable to react the gaseous suspensions with $TiCl_4$ before the $TiO_2$ particulates grow beyond about 0.15 micron (average diameter) in particle size.

According to a further embodiment of Example IV, a premixed suspension of titanium dioxide solids in an oxygen-containing gas and having present therein a small amount of an aromatic organic compound is pre-heated to the temperatures taught herein and contacted almost immediately thereafter with titanium tetrachloride as contemplated herein. If desired, the titanium dioxide solids may be suspended in a gaseous medium other than oxygen, only inert with respect to the solids, the resulting suspension pre-heated and then contacted with separate streams of pre-heated oxygen-containing gas and titanium tetrachloride. The aromatic organic compound may be present with the titanium dioxide suspension or it may be added with an inert gas. Typically, gaseous nitrogen may be employed as the inert medium.

The concentration of preformed titanium dioxide fed to the reaction zone is generally from about 0.1 up to about 20 mole percent, preferably from about 0.5 to 15 mole percent, basis the total $TiCl_4$ reactant to be contacted therewith in the reaction zone. A higher concentration up to about 30 mole percent or more may be employed, however.

Obviously, the mole concentration of $TiCl_4$ providing the preformed $TiO_2$ would correspond to the $TiO_2$ mole percentage.

EXAMPLE V

Referring to FIGURE 4, furnace assembly B was made up of an electric furnace 14 which was 24-inches long and had a 4-inch (diameter) quartz tube 15 vertically-disposed therein. The upper and lower halves of heating means 14 were separately controlled as to temperature. A burner assembly 31 comprising tubes 11, 13 and 18 was directed, as described above, into furnace assembly B, the ends of tubes 11 and 13 extending to a point about 6 inches below the furnace top 20.

Tubes 11, 13 and 18 were fabricated from silica tubing (quartz and Vycor) and had internal diameters, respectively, of 17 millimeters, 10 millimeters and 1.1 millimeters. The tip of pilot jet 18 was positioned 2 or 3 centimeters (see Table III) above circumferential slot 7, thus providing reaction zone 9. Circumferential slot 7 was 0.5 millimeter in width. It is obvious from these dimensions that FIGURE 1 is not drawn to scale.

In operation gaseous $TiCl_4$ was fed via space 16 through slot 7 to reaction zone 8, while simultaneously gaseous $AlCl_3$ was fed via jet 18 into reaction zone 9 and gaseous anhydrous oxygen passed downwardly through tube 13. Reaction between $AlCl_3$ and $O_2$ took place to produce $Al_2O_3$ nuclei having an average particle size below about 0.1 micron. The resulting suspension of $Al_2O_3$ solids in excess oxygen was contacted almost immediately thereafter with the $TiCl_4$ stream entering reaction zone 8 through slot 7.

The temperature in reaction zone 8 was maintained by means of heating means 14 at about 1000° C. throughout a 30-minute run. Product $TiO_2$ passed through tube 5 to the collector (not shown).

The following table gives the reaction conditions in four (4) typical runs:

*Table III*

| Run No. | $TiCl_4$ Feed Rate [1] | $O_2$ Molar Ratio [2] | $AlCl_3$ Concentration [3] | Pilot Retraction [4] | Pre-heat Temp., ° C. | Reaction Temp., ° C. |
|---|---|---|---|---|---|---|
| 1 | 21.4 | 1.17 | 3 | 2 | 950 | 1,000 |
| 2 | 20.9 | 1.20 | 3 | 2 | 930 | 1,000 |
| 3 | 19.9 | 1.26 | 3 | 3 | 950 | 1,000 |
| 4 | 40.0 | 1.25 | 3 | [5] 2 | 930 | 1,000 |

[1] Millimoles per minute.
[2] $O_2/TiCl_4$ molar ratio.
[3] Mole percent, $TiCl_4$ basis.
[4] Distance from tip of pilot jet 3 to slot 7 in centimeters.
[5] Pilot jet 3 used in Run 4 was 2.2 millimeters in diameter.

The $TiO_2$ pigment produced in Example V above was predominantly in the rutile crystalline form, was well-dispersed, of uniform particle size and had good tinting strength. The average particle size thereof was about 0.2 micron.

EXAMPLE VI

The runs in Table III of Example V are repeated using the burner and furnace assembly depicted in FIGURE 5 of the drawings.

Furnace assembly B is identical in dimensions to the corresponding furnace assembly B in FIGURE 4 described in Example V, supra.

Burner assembly C is fabricated from a refractory material. Tubes 11, 13 and 22 have internal diameters, respectively, of 37.5 millimeters, 25 millimeters and 17.5 millimeters, the walls of tubes 13 and 22 being, respectively, about 3 millimeters thick. Circumferential slots 26 and 7 are, respectively, 0.5 millimeter and 1 millimeter in width, there being a distance of about 2.5 centimeters between the slots.

Runs 5, 6, 7 and 8 were made using burner assembly C just described and under the same conditions, respectively, given in Table III of Example V, for runs 1, 2, 3 and 4, the only difference being that the aluminum chloride is directed through tube 22 and anhydrous oxygen passes through tube 13 and circumferential slot 26 as shown in FIGURE 5 of the drawing.

The $TiO_2$ pigment produced in Example VI was predominantly in the rutile crystalline form, was well-dispersed, of uniform particle size and had good tinting strength. The average particle size thereof was about 0.2 micron.

EXAMPLE VII

The furnace and burner assemblies used in this example were identical to those used in Example V above and shown in FIGURE 4. The tip of pilot jet 18 was positioned about 2 centimeters above circumferential slot 7.

Gaseous $TiCl_4$ containing a concentration of 25 mole percent gaseous elemental chlorine, basis the total $TiCl_4$, was fed via space 16 through slot 7 to reaction zone 8 at a rate sufficient to provide 19.9 millimoles of $TiCl_4$ per minute. Simultaneously, gaseous $AlCl_3$ was fed via jet 18 into reaction zone 9 at a rate to provide an $AlCl_3$ concentration of 3 mole percent basis the $TiCl_4$ being fed to reaction zone 8. Also, at the same time, gaseous anhydrous oxygen was fed through tube 13 at a rate sufficient to provide an $O_2$ to $TiCl_4$ molar ratio of 1.26.

Reaction between the $AlCl_3$ and $O_2$ took place to produce $Al_2O_3$ nuclei having an average particle size below about 0.1 micron. The resulting suspension of $Al_2O_3$ solids in excess oxygen was contacted almost immediately thereafter with the $TiCl_4$-$Cl_2$ mixture entering reaction zone 8 through slot 7.

The temperature in reaction zone 9 was maintained by means of heating means 14 at about 900° C. throughout a 30-minute run and in reaction zone 8 at about 1000° C. Product $TiO_2$ passed through tube 5 to the collector (not shown).

The $TiO_2$ pigment produced in Example VII was predominantly in the rutile crystalline form, was well-dispersed, of uniform particle size and had good tinting strength. The average particle size thereof was about 0.2 micron.

According to the instant discovery, $AlCl_3$, $O_2$ and $TiCl_4$ preferably are pre-heated separately to a temperature between about 800° C. and 1100° C. Although this is a preferred embodiment, pre-heat temperatures from about 500° C. to about 1200° C. are contemplated herein and reaction temperatures ranging from about 700° C. to about 1500° C., preferably between 850° C. and 1100° C. Of course, these pre-heat temperatures apply to $Cl_2$ as well whenever it is present.

The mole ratio of $TiCl_4$ to $O_2$ fed to reaction zone 8 may range from 1:1 to 1:10, preferably from 1:1 to 1:5.

While Examples V, VI and VII illustrate producing Al$_2$O$_3$ solids immediately upstream from the TiO$_2$ reaction zone and contacting these solids suspended in oxygen gas immediately thereafter with gaseous TiCl$_4$, other nuclei having an average particle size between about 0.01 and 0.15 micron, preferably between 0.05 and 0.1 micron, are contemplated as well. Generally, a substantially greater portion of the solids or substantially all of the solids (nuclei) are less than about 0.15 micron in size (diameter). Included among the metal oxide nuclei contemplated herein are the oxides of silicon, titanium, zinc, boron, zirconium, antimony, tin, and the like, which may be used per se or in any combination of one with the other or with Al$_2$O$_3$. These white, water-insoluble oxides are preferably prepared in situ, as it were, from their corresponding volatilizable metal halides and introduced almost immediately thereafter as suspended solid nuclei in an oxygen-containing gas into a TiO$_2$ reaction zone. Otherwise stated, a suspension of metal oxide solids in an O$_2$-containing gas may be prepared and in less than about 8 seconds after preparation thereof contacted with TiCl$_4$.

According to a further embodiment a pre-mixed suspension of metal oxide nucleating solids of desired size in oxygen-containing gas is pre-heated to the temperatures taught herein and contacted almost immediately thereafter with TiCl$_4$ or TiCl$_4$-Cl$_2$ as contemplated herein. If desired, the metal oxide nucleating solids may be suspended in a gaseous medium other than oxygen, only inert with respect to the solids, the resulting suspension preheated and then contacted very shortly thereafter with separate streams of pre-heated oxygen-containing gas and TiCl$_4$ or TiCl$_4$-Cl$_2$. Typically, gaseous nitrogen might be employed as the inert medium.

Whenever elemental chlorine is used according to the invention described above it may be introduced as a separate stream fed at the point of merger or merging contact of the TiCl$_4$ with the gaseous suspension of metal oxide solids.

While Example V, for instance, teaches a single circumferential slot as the preferred means for feeding TiCl$_4$ to reaction zone 8, other modifications, such as a plurality of slots or openings providing spray-like streams of TiCl$_4$ capable of impinging upon a moving gaseous suspension, are also contemplated. Furthermore, although radial introduction of TiCl$_4$-Cl$_2$ into a moving stream of suspended solids is preferred, other methods for impinging streams are within the purview of the present discovery. For example, a stream comprising the suspension and a stream containing the TiCl$_4$ or a TiCl$_4$-Cl$_2$ mixture may be made to angularly converge into merging contact, as described above.

The metal oxide, such as Al$_2$O$_3$, concentration is generally from about 0.1 up to about 10 mole percent, preferably from about 0.5 to 4 mole percent, basis the TiCl$_4$ reactant. A higher concentration up to about 20 mole percent or more may be employed, however.

The amount of Cl$_2$, vaporous or liquid, added to the reaction zone is generally sufficient to provide an excess of Cl$_2$ in the reaction product (exclusive of any Cl$_2$ resulting from the oxidation of a metal halide to produce nuclei) of up to about 50 percent in excess of the theoretical amount of elemental chlorine resulting from the reaction: TiCl$_4$+O$_2$→TiO$_2$+2Cl$_2$, occurring in the process. Assuming complete conversion, therefore, of TiCl$_4$ to TiO$_2$ and 2Cl$_2$, the instant invention contemplates up to about 3 moles of Cl$_2$ in the reaction product per mole of TiClw$_4$ reactant, generally less than about 2.75 moles and preferably between 1.0 and 2.5 moles plus any Cl$_2$ resulting from the reaction of AlCl$_3$ with oxygen.

As stated above, the reason for the enhanced results achieved by the instant process is not fully understood. There is reason to believe, however, that the impinging reactant streams effect better distribution of the metal oxide nucleating particulates throughout the reaction zone.

The average particle size (diameter) of the TiO$_2$ pigment prepared as contemplated herein is generally less than about 0.25 micron and usually in the range between 0.1 to 0.22 micron.

The consecutive reaction zone arrangement described in the present invention as a preferred embodiment is effective in eliminating or substantially minimizing burner growth.

While the embodiments of Examples V, VI and VII, above, disclose only distances in the range of 2 to 3 centimeters between the tip of pilot jet 18 (or circumferential slot 26) and circumferential slot 7, distances between about 0.5 centimeter and about 3.0 centimeters or more are contemplated herein.

EXAMPLE VIII

In this example, a furnace assembly B of the general structure shown in FIGURE 6 was employed which was made up of an electric furnace 14 which was 24 inches long and had a 4 inch diameter quartz tube 15 vertically disposed therein. The upper and lower halves of heating means 14 were separately controlled as to temperature. The burner assembly D shown in FIGURE 6 was directed vertically downward, as described above. into furnace assembly B, the ends of tubes 200, 400, 600 and 800 extending to a point about 6 inches below the furnace top 20, thus utilizing the upper 6 inch portion of furnace B as a preheater and the lower 18 inches as a reaction space heater. Tubes 200, 400, 600 and 800 were fabricated from Grade A lava (high grade naturally occurring aluminum silicate, which has been fired to a refractory, machineable material) and had internal diameters of 2.75, 2.25, 0.50 and 0.35 inches respectively, and external diameters of 3.0, 2.5, .75 and .45 inches, respectively. The diameter of opening 2600 in flat face 2200 was 0.625 inch. The diameter of opening 2800 in flat face 2400 was 0.5 inch, or the same as the inside diameter of tube 600. The slot 3200 between flat faces 2200 and 2400 had a width of 0.04 inch. Slot 3000 had a width of 0.04 inch.

Gaseous titanium tetrachloride was fed continuously via space 1600 into the reaction zone through slot 3000 so as to provide a rate of TiCl$_4$ emanating from slot 3000 of 40 millimoles per minute. Anhydrous oxygen in the amount of 125 mole percent, based on the amount of titanium tetrachloride introduced, was continuously fed via space 2000 into contact area 3400. The reactant streams were each preheated so that they entered the contact space 3400 at a temperature of 900° C.

Preheating of the reactant streams was done in two stages. The first stage was performed by passing the reactant streams through separate bayonet heaters located external to burner D. The second stage of preheating was accomplished while the separate reactant streams were passing through their respective passages in the six inch portion of burner D immersed in furnace B. This immersed section of burner D thus served as the second preheating stage.

The furnace was initially heated to 1000° C. Twenty-five mole percent of chlorine, based upon the quantity of titanium tetrachloride feed was continuously introduced via space 1800 as the inner inert gas stream. Three mole percent AlCl$_3$, based upon the quantity of titanium tetrachloride feed was added to the oxygen stream in space 2000 via pilot tube 18. The tip of pilot tube 18 was spaced about 1 inch above the exit end of tube 600.

To produce the outer inert gas stream, chlorine gas was fed via slot 3200 into the reaction space 3800 at a rate equal to 100 mole percent, based upon the amount of titanium tetrachloride introduced.

Reaction chamber 3800 was maintained at an average temperature of 1000° C. during the run.

In operation, TiCl₄ vapor flowed continuously through slot 3200 and impinged against the oxygen stream flowing through central passage 2000, and simultaneously against the thin annular stream of Cl₂, gas flowing through passage 1800. As may be seen from FIGURE 6, the direction of flow of the TiCl₄ through slot 3200 was transverse to the direction of flow of the oxygen stream. Thus the gases were contacted in the relatively small contact area designated 3400 in FIGURE 6. The gases from contact area 3400 flowed through opening 2800 in flat face 2400 and expanded rapidly into the reaction space 3800. The reaction space 3800, as may be clearly seen, is much larger than the contact area 3400. Thus, the diameter of contact area 3400 was approximately equal to the diameter of opening 2800, or 0.5 inch, while the diameter of the space into which the gases expanded, was equal to the diameter of tube 15, or 4 inches.

The radial or lateral mass velocity of the outer inert gas stream flowing through slot 3200 was small in comparison with the mass velocity of the gases flowing through opening 2800, so that the outer inert gas stream flowed into reaction space 3800 in the direction of flow of the reactants from points surrounding the reaction mixture.

After two hours of operation the reactor was shut down and the surfaces were inspected. It was found that the walls of the feed tubes 200, 400, 600 and 800 and nozzles 2200 and 2400 and the wall 1100 of the furnace were completely free of titanium dioxide deposit. An excellent quality TiO₂ pigment was obtained which was substantially completely rutile and had a slightly blue undertone. The average particle size of the TiO₂ produced was almost 0.25 micron. The pigment had excellent hiding power and particle size uniformity.

EXAMPLE IX

Example VIII was duplicated using the apparatus of FIGURE 6. Reactant conditions, flow rates and temperatures were the same as in Example VIII. The diameter of opening 2600 in flat face 2200 was increased to 1 inch. AlCl₃ rather than being introduced through pilot tube 18 was aspirated into the inner gas stream prior to introduction of this stream into space 1800. The mixture of Cl₂ and AlCl₃ was fed through space 1800 at a rate to continuously provide 25 mole percent chlorine and 3 mole percent AlCl₃, based on the quantity of TiCl₄ feed, at the exit end of space 1800. Chlorine gas was fed in the upper portion of the reaction space through slot 3200 at a rate of 100 mole percent based upon the quantity of TiCl₄ introduced. The reaction was carried out for 2 hours, after which time the furnace was shut down. The surface of the feed tubes, nozzles and furnace walls were inspected for TiO₂ deposit and found to contain only a trace of titanium dioxide. The pigment obtained was substantially completely rutile, had a blue undertone. The average particle size was 0.25 micron. The product has excellent hiding power and uniform particle size distribution.

EXAMPLE X

Example IX was duplicated using the burner of FIGURE 6. Reactant flow rates, conditions and temperature was the same as in Example IX. Chlorine gas was introduced into the upper portion of the reaction space through slot 3200 at a rate of 50 mole percent, based upon the amount of titanium tetrachloride introduced. Chlorine gas was also introduced through passage 1800 at a rate equal to 25 mole percent, based upon the quantity of TiCl₄ feed. The reaction was continued for 2 hours, and after the furnace was shut down, the surfaces of the feed tubes, nozzles, and furnace were inspected. Substantially no titanium dioxide was found on the walls. The titanium dioxide produced was substantially completely rutile, and had a high tinting strength with a blue undertone. The product had excellent hiding power, and uniform particle size distribution.

EXAMPLE XI

Example X was duplicated and the run continued for 6 hours, at which time the reactor was shut down and the walls inspected for burner growth. Substantially no titanium dioxide was found on the walls. The quality of titanium dioxide produced was excellent, being substantially completely rutile and having a high tinting strength with a blue undertone. The product had excellent hiding power and uniform particle size distribution.

EXAMPLE XII

Example VIII was duplicated using the apparatus of FIGURE 6. The conditions and flow rates of the reactant streams were the same as in Example VIII. Chlorine gas was introduced at the top of the reaction space through slot 3200 at the rate 25 mole percent based upon the quantity of titanium tetrachloride feed. Chlorine gas was introduced through passage 1800 at a rate equal to 25 mole percent based upon the rate of TiCl₄ feed. At the end of 2 hours, the reactor was shut down and the walls inspected for burner growth. A thin layer of burner growth which amounted to 1.84 grams covered the surfaces. The titanium dioxide pigment was predominantly rutile and had a high tinting strength and a slightly blue undertone.

EXAMPLE XIII

The burner of FIGURE 7 was inserted into the furnace of FIGURE 6. Reactant feed rates, conditions and preheat temperatures were the same as in Example VIII. Chlorine gas was fed into the upper portion of the reaction space through slot 3200 at a rate equal to 100 mole percent of the TiCl₄ introduced. Chlorine gas was also fed through passage 1800 at a rate equal to 25 mole percent of the TiCl₄ introduced. Nozzle 2220 was 3 inches in length and of narrow flare. The upper diameter of opening 2620 in nozzle 2220 adjacent flat face 2400 was ⅝ inch, and the lower diameter of opening 2620 measured at the tip was 1½ inches. The chlorine gas introduced through slot 3200 flowed over the surface of nozzle 2220 surrounding opening 2220, and formed a thin shell which was frusto-conical in shape. The frusto-conical shape of opening 2220 allowed uniform expansion of the reacting gaseous mixture as it flowed through the opening. The reaction was carried out for 2 hours, at which time the reactor was shut down and the surface of the bore inspected for titanium dioxide. The nozzle surface surrounding opening 2600 was coated with 45 grams of titanium oxide. The titanium oxide pigment was predominantly rutile and had a high tinting strength with a blue undertone. The average particle size was about 0.30 micron. The product had excellent hiding power and uniform particle size distribution.

EXAMPLE XIV

Example XIII was duplicated using the burner of FIGURE 7. Reactant feed rates, conditions and preheat temperature were the same as in Example XIII. Nozzle 2220 was 2 inches in length and had a medium flare. The upper diameter of opening 2620 in nozzle 2220 adjacent flat face 2400 measured ⅝ inch, and the lower diameter of opening 2620 measured 1½ inches at the tip. Chlorine gas was fed into the upper portion of the reaction space via slot 3200 at a rate of 100 mole percent based on the quantity of TiCl₄ feed. Chlorine gas was also fed via passage 1800 at a rate of 25 mole percent based upon the quantity of TiCl₄ feed. The reaction was continued for 2 hours, at which time the reactor was shut down and the surfaces of nozzle 2220 surrounding opening 2620 inspected for titanium dioxide. The surface was coated with 12 grams of titanium dioxide. The product was predominantly rutile and had a high tinting strength with a slightly blue undertone. The average particle size of the product was about 0.27 micron, and it had good size uniformity.

EXAMPLE XV

Example XIII was duplicated using the burner of FIGURE 7. Reactant feed rates, conditions and preheat temperature were the same as in Example XIII. Nozzle 2220 was 2 inches in length and had a wide flare. The upper diameter of opening 2620 in nozzle 2220 adjacent flat face 2400 measured 5/8 inch and the lower diameter of opening 2600 measured 2 3/8 inches at the tip. Chlorine gas was introduced into the top of the reaction space at a rate of 100 mole percent based on the rate of TiCl₄ introduced. Chlorine gas was also introduced via passage 1800 at a rate of 25 mole percent based upon the quantity of TiCl₄ feed. The reaction was shut down after 2 hours operation and the surfaces of nozzle 2220 surrounding opening 2600 was inspected for titanium dioxide. The surface was coated with 9 grams of titanium dioxide. The pigment was predominantly rutile, had a high tinting strength, slightly blue undertone, and uniform particle size distribution. The average particle size of the product was about 0.22 micron.

EXAMPLE XVI

The burner of FIGURE 8 was inserted into the furnace of FIGURE 6. Reactant feed rates, conditions, and preheat temperatures were the same as in Example VIII. Chlorine gas was fed into the upper portion of the reaction space through slot 3200 at a rate equal to 50 mole percent of the TiCl₄ introduced. The chlorine gas leaving slot 3200 impinged upon baffle 2800 and was directed downwardly into the reaction space, so that the radial or lateral velocity of the outer inert gas stream was substantially zero at the point of contact with the reacting streams. Chlorine gas was also fed through passage 1800 at a rate equal to 25 mole percent of the TiCl₄ introduced. The reaction was carried out for 2 hours, at which time the reactor was shut down and the surface of the burner inspected for titanium dioxide. The internal surfaces were free of titanium dioxide. The titanium dioxide produced was predominantly rutile and had a high tinting strength with a blue undertone. The product had excellent hiding power, uniform particle size distribution and an average particle size of about 0.19 micron.

EXAMPLE XVII

Example VIII was repeated using the apparatus of FIGURE 6. The conditions, rates of flow, and temperature of the reactant streams were the same as in Example VIII. No chlorine gas was introduced via slot 3200 into the top of the reaction space. Chlorine gas was introduced through passage 1800 into contact area 3400 at a rate equal to 75 mole percent, based upon the quantity of TiCl₄ feed. The reaction was continued for 6 hours at the end of the reaction, substantially no titanium dioxide was found on the feed tubes or internal surfaces of the furnace. The product was predominantly rutile and had a high tinting strength with a blue undertone.

EXAMPLE XVIII

Example VIII was repeated using the apparatus of FIGURE 6. Flow rates, conditions and temperatures of the reactant streams were the same as Example VIII. No chlorine gas was fed through passage 1800. Chlorine gas was fed into the top of the reaction space via slot 3200 at a rate of 100 mole percent upon the quantity of TiCl₄ feed. The run was continued for 2 hours. The product had high tinting strength with a blue undertone. The product had good hiding power and uniform particle size distribution.

The characteristics of the flame produced by the reaction was determined by probing the reaction space with a quartz rod while the reaction was being carried out using the conditions of Example VIII. Table IV shows the results of these tests:

*Table IV*

| Run No. | TiCl₄ Inlet | Probe Depth [1] | Probe Growth |
|---|---|---|---|
| 1 | Slot | 6 | Pigmentary. |
| 2 | Slot | 3 | Crusty. |
| 3 | Slot | 4.5 | Pigmentary. |

[1] Inches below flat face 2200.

Table IV indicates that the reaction is essentially complete at a distance 4.5 to 6 inches below flat face 2200 and that the reaction is incomplete at a distance of 3 inches below flat face 2200. The length of reacting stream flow profile 3800 therefore varies between about 3 inches and 6 inches in length. The outer inert gas stream as has been indicated above should enter the reaction space at a point located in the upper half of the reacting stream flow profile. The temperature of the reaction space at the point of introduction should be sufficiently high to carry out the oxidation reaction.

The dimensions and materials of construction and various embodiments given in the disclosure heretofore set forth are merely illustrative of specific features of the invention herein contemplated and are not intended to limit in any manner the scope of the invention herein described and claimed.

The average particle size of the TiO₂ pigment prepared according to Examples VIII to XVII is generally less than 0.3 micron and usually in the range between 0.1 and 0.25 micron.

Even though the process of the above examples operated at substantially atmospheric pressures, the instant discovery contemplates pressures ranging from 0.5 to 3.0 atmospheres or more.

In addition to titanium tetrachloride, other titanium halides, such as titanium iodide, bromide and fluoride may be employed in the instant process. Additionally, the herein described process is not limited to the oxidation of titanium halide, but may conveniently be used to produce silicon dioxide, zirconium dioxide, tin dioxide, lead dioxide, and so forth.

The above advantages and many others will be apparent to the skilled chemist or chemical engineer. Not only does the present invention contemplate within its scope modifications within the skill of the art, but the details given hereinabove are not intended to limit the scope of the invention except insofar as limitations appear in the appended claims.

This application is a continuation-in-part of co-pending application Serial No. 696,743, filed November 15, 1957, now United States Letters Patent 2,968,529, patented January 17, 1961; and co-pending application Serial No. 743,946, filed June 23, 1958, now abandoned. Related subject matter is disclosed in application Serial No. 745,627, filed June 30, 1958, now abandoned, in which applicant is a joint inventor with Franklin Strain and Paul L. Dietz, Jr. Related subject matter is also disclosed in co-pending application Serial No. 743,840, filed June 23, 1958, now abandoned, in which applicant is a co-inventor with Paul L. Dietz, Jr.

I claim:

1. In the method of preparing pigmentary titanium oxide by vapor phase oxidation of titanium tetrachloride, the improvement which comprises establishing a hot gaseous stream of oxygen centrally located within an introduction zone and introducing titanium tetrachloride vapor in a lateral direction against the oxygen stream from a discharge source about said introduction zone, said titanium tetrachloride discharge source defining the boundaries of the cross-sectional area of said introduction zone as determined perpendicular to the oxygen flow, feeding an inert gas within said zone surrounding said oxygen stream and prior to the introduction of said titanium tetrachloride vapor; projecting the hot gaseous mixture of oxygen, titanium tetrachloride and inert gas into a reaction zone at 700° to 1500° C. and having a cross-sectional area as measured perpendicular to the line of flow at least about 50 percent greater than said introduction zone and withdrawing the pigmentary titanium oxide produced from said reaction zone.

2. In the method of preparing pigmentary $TiO_2$ by the vapor phase oxidation of $TiCl_4$, the improvement which comprises establishing a hot gaseous stream of oxygen centrally located within an introduction zone and introducing vaporous $TiCl_4$ in a lateral direction against the oxygen stream from a discharge source about said introduction zone, said $TiCl_4$ discharge source defining the boundaries of the cross-sectional area of said introduction zone as determined perpendicular to the oxygen flow; projecting the hot gaseous mixture of oxygen and $TiCl_4$ into a reaction zone at 700° to 1500° C. and having a cross-sectional area as measured perpendicular to the line of flow at least about 50% greater than said introduction zone and withdrawing the pigmentary titanium dioxide produced from said reaction zone.

3. In the method of preparing pigmentary $TiO_2$ by the vapor phase oxidation of $TiCl_4$, the improvement which comprises establishing a hot gaseous stream of oxygen centrally located within an introduction zone and introducing vaporous $TiCl_4$ in a lateral direction against said oxygen stream from a discharge source about said introduction zone, said $TiCl_4$ discharge source defining the boundaries of the cross-sectional area of said introduction zone as determined perpendicular to the oxygen flow; projecting the hot gaseous mixture of oxygen and $TiCl_4$ into a reaction zone at 700° to 1500° C. and having a cross-sectional area as measured perpendicular to the line of flow at least about 50% greater than said introduction zone while simultaneously introducing prior to the projection of the gaseous mixture into the reaction zone from sources in a plane perpendicular to the flow of the gaseous mixture and surrounding said introduction zone, an inert gas, which inert gas is maintained in the direction of the flow of the gaseous mitxure into the reaction zone, and withdrawing the produced pigmentary titanium dioxide from said reaction zone.

4. The method of claim 3 wherein inert gas is simultaneously introduced into said introduction zone within said zone surrounding said oxygen stream and prior to the introduction of said vaporous $TiCl_4$.

5. The process of claim 4 wherein a small amount of aromatic organic compound is introduced with the vaporous $TiCl_4$.

6. The process of claim 1 wherein oxygen is introduced at a temperature higher than the temperature of the $TiCl_4$ introduced.

7. The process of claim 6 wherein metal oxide is introduced into the hot reacting gaseous mixture by introducing it with the inert gas introduced into the introduction zone.

8. The method of claim 2 wherein the titanium tetrachloride is projected from a discharge source circularly surrounding the oxygen stream.

References Cited in the file of this patent

UNITED STATES PATENTS

| | | |
|---|---|---|
| 2,367,118 | Heinen | Jan. 9, 1945 |
| 2,445,691 | Pechukas | July 20, 1948 |
| 2,559,638 | Krchma et al. | July 10, 1951 |
| 2,750,260 | Nelson et al. | June 12, 1956 |
| 2,760,846 | Richmond et al. | Aug. 28, 1956 |
| 2,823,982 | Saladin et al. | Feb. 18, 1958 |
| 2,915,367 | Olson et al. | Dec. 1, 1959 |
| 2,980,509 | Frey | Apr. 18, 1961 |

UNITED STATES PATENT OFFICE
CERTIFICATE OF CORRECTION

Patent No. 3,069,281                          December 18, 1962

William L. Wilson

It is hereby certified that error appears in the above numbered patent requiring correction and that the said Letters Patent should read as corrected below.

Column 1, lines 10 and 11, for "improvide" read -- improved --; line 26, for "a sustain" read -- to sustain --; line 62, for "terachloride" read -- tetrachloride --; column 8, line 32, for "millieters" read -- millimeters --; column 9, line 2, for "tabe" read -- table --; same column 9, Table 2, for the column heading "$TiCl_4$ Feed Rate$^2$" read -- $TiCl_4$ Feed Rate$^1$ --; line 20, for "for uniform" read -- of uniform --; line 39, for "milliameter" read -- millimeter --; column 12, lines 1, 2 and 3, for "strength. The average particle size thereof was about 0.2 micron. persed, of uniform particle size and had good tinting" read -- persed, of uniform particle size and had good tinting strength. The average particle size thereof was about 0.2 micron. --; column 13, line 68, for "$TiClw_4$" read -- $TiCl_4$ --.

Signed and sealed this 7th day of April 1964.

(SEAL)
Attest:

ERNEST W. SWIDER

Attesting Officer

EDWARD J. BRENNER

Commissioner of Patents